US006537383B1

(12) United States Patent
Mandke et al.

(10) Patent No.: US 6,537,383 B1
(45) Date of Patent: Mar. 25, 2003

(54) SUBSEA PIG LAUNCHER

(75) Inventors: J. S. Mandke, Katy, TX (US); Brian Smith, Woodsetts (GB)

(73) Assignees: Halliburton Energy Services, Inc., Houston, TX (US); General Signal UK Limited, Stockport (GB)

( * ) Notice: Subject to any disclaimer, the term of this patent is extended or adjusted under 35 U.S.C. 154(b) by 0 days.

(21) Appl. No.: 09/714,334

(22) Filed: Nov. 16, 2000

Related U.S. Application Data
(60) Provisional application No. 60/246,769, filed on Nov. 8, 2000.

(51) Int. Cl.[7] .............................. B08B 1/00; B08B 9/04; F16L 55/00
(52) U.S. Cl. ................. 134/8; 15/3.5; 15/3.51
(58) Field of Search ................. 134/8; 15/3.5, 15/3.51, 104.062

(56) References Cited

U.S. PATENT DOCUMENTS

| | | | | |
|---|---|---|---|---|
| 3,175,240 A | * | 3/1965 | Hillard ................. | 15/104.062 |
| 5,139,576 A | * | 8/1992 | Davis ...................... | 134/8 |
| 5,913,637 A | * | 6/1999 | Rajabali et al. ............. | 405/169 |
| 6,022,421 A | * | 2/2000 | Bath et al. ................... | 134/8 |

OTHER PUBLICATIONS

Mike Cunningham, "Remotely Operable Subsea Pig Launcher", ASME International publication (2001).
Oceaneering Intervention Engineering Publication "Multiple Pig Launcher", (2001).

* cited by examiner

*Primary Examiner*—Zeinab El-Arini
(74) *Attorney, Agent, or Firm*—Conley Rose, P.C.

(57) ABSTRACT

A system for storing pigs and launching them into a pipeline comprises a pig storage barrel having an inlet end and an outlet end and an inside diameter sized to accommodate the pigs, the storage barrel including a pig parking chamber for controlling release of the pigs, and a pig launching chamber downstream of the storage barrel. The launching chamber is connected to the pipeline so as to be able to launch a pig into the pipeline. The apparatus also includes a hydraulic pig advancing system in fluid communication with the storage barrel and the launching chamber and a fluid flush system in fluid communication with the storage barrel chamber and the launching chamber. The method includes flushing the storage barrel and the launching chamber after each launching cycle so that between launchings the system is filled with hydraulic fluid.

16 Claims, 3 Drawing Sheets

SUBSEA PIG LAUNCHER

CROSS-REFERENCE TO RELATED APPLICATIONS

This application claims benefit of provisional application Ser. No. 60/246,769, filed Nov. 8, 2000 and entitled "Subsea Pig Launcher," which is incorporated herein by reference.

STATEMENT REGARDING FEDERALLY SPONSORED RESEARCH OR DEVELOPMENT

Not applicable.

TECHNICAL FIELD OF THE INVENTION

The present invention relates generally to subsea pig launching, and more particularly to a method and apparatus for storing and sequentially launching multiple pigs from a remote location. Still more particularly, the present invention is a method and apparatus for launching a series of pigs over a relatively long period of time.

BACKGROUND OF THE INVENTION

In the oil and gas industry, it is common to remove petroleum deposits and other debris from pipelines by pushing a scraper, referred to as a "pig," through the lines using fluid pressure. The pig is introduced into the pipeline from a launching system that typically includes a releasable retainer for retaining the unlaunched pig and a source of fluid pressure connected to the housing behind the pig.

Subsea satellite wells, manifolds or templates in deepwater are typically connected to a host platform via subsea flowlines that transport the produced hydrocarbon fluid along the sea floor. Such systems are often referred to as "tie-back" systems. As with other types of pipelines, flowlines in tie-back systems need to be pigged periodically during their operation to remove paraffin deposits, displace liquids, etc. The traditional method of pigging such flowlines has been to use "round trip pigging" which requires a pair of parallel flowlines between the host platform and the manifold or the wellhead. Thus, pigs are launched from and received at the host platform, traveling outward through one flowline and returning through the other.

A more economical option for deepwater flowlines is to use "single trip pigging" using a single flowline between the manifold and the host platform. In single trip pigging, the pigs are launched from a pig launcher mounted on the subsea manifold and received on the host platform. The pig launcher can also be mounted on wellhead or pipeline end manifold (PLEM) sled which is connected to production manifold/wellhead via jumpers. The economic advantages of single trip pigging over round trip pigging become even greater in "extended tie-back" systems, where the distance between the manifold and the platform can be as much as 50 to 60 miles.

In order to maximize the advantage of a single trip pigging system, the cost of offshore intervention in the system should be minimized. Such intervention is required either to replace the pigs in the launcher or to retrieve the launcher and recharge it with a new set of pigs after the previous set has been launched into the flowline. This implies that the pig launcher should be able to hold large number of pigs and, for deepwater application, all pigging operations should be performed using an ROV or remotely from the host platform. Furthermore, depending on the pigging operation frequency, the pigs are likely to be left in the launcher over a long period, as much as one to two years. However, since conventional pigs tend to degrade when exposed to hydrocarbons or methanol for a long period, conventional pigs cannot be left exposed to hydrocarbons or methanol while they are stored in the pig launcher.

BRIEF SUMMARY OF THE INVENTION

The present invention provides an apparatus for launching pigs into a subsea flowline that connects a subsea manifold, template or a wellhead to host platform. The subsea pig launcher described herein addresses the issues identified above. Whereas in the following discussion, the subsea pig launcher is always assumed to have been installed on a manifold, the apparatus can be easily adapted for other applications such as pigging from a subsea wellhead, template or a pipeline end manifold (PLEM) sled at the end of flowline.

More particularly, a method and apparatus have been developed for loading multiple pigs into a subsea pig launcher barrel, storing them inside the barrel over an extended period of time and then releasing the pigs remotely, one at a time, into a subsea flowline or pipeline as needed. The inside diameter of the launcher barrel is preferably slightly larger than the outside diameter of the pigs, so as to allow easy movement of pigs inside the barrel. Since the pigs are pushed inside the barrel by a positive fluid pressure, the system can operate even with the barrel made to fit the pig outside diameter. The top or rearmost pig is constructed so that its outside diameter seals against the inside wall of the barrel, and is therefore referred to as the "piston pig."

The pigs are advanced inside the barrel by providing hydraulic fluid under pressure behind the piston pig. This advances the stored pigs until the foremost pig is adjacent to a chamber called "pig parking chamber" at the bottom of the barrel. The entrance of the pig parking chamber can be opened to allow the foremost pig to enter the chamber. In the chamber, the foremost pig is held between two pig stops. A kicker line connected to parking chamber is provided for pumping hydraulic fluid behind the parked pig. By releasing the lower pig stop and pumping hydraulic fluid under pressure through the kicker line, the foremost pig can be launched into another chamber called the "pig launching chamber." The pig launching chamber preferably has an isolation valve at each end, which isolates it from the production header and flowline on one side and the pig parking chamber on the other side. A production kicker line connected to the launching chamber permits introduction of production fluids (hydrocarbons) behind the pig inside the launching chamber.

From the launching chamber, the pig is pushed into the production header by opening the isolation valve between the production header and the launching chamber. Once the pig travels from the production header into the flowline, the isolation valve between the launching chamber and the production header is closed. The launching chamber is preferably then flushed with methanol and then with hydraulic fluid to wash out the residual hydrocarbon fluids.

After all pigs have been launched, the closure at the top of launcher barrel is opened by ROV (remotely operated vehicle) and a new set of pigs is stacked inside the barrel. The apparatus of the present invention, and in particular the pig storage barrel and pig parking chamber, are novel features. By separating the pig launching from the pig storage, the present system allows the pigs to be stored in hydraulic or control fluid, i.e. fluid that will not degrade the pigs, and also ensures that sufficient fluid volume is available to launch the pigs.

The hydraulic fluid to be used for pushing pigs can be similar to the control fluids conventionally used for subsea systems, or can be any other suitable fluid that has a density greater than seawater, is environmentally acceptable, and is chemically non-reactive with the pig material.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
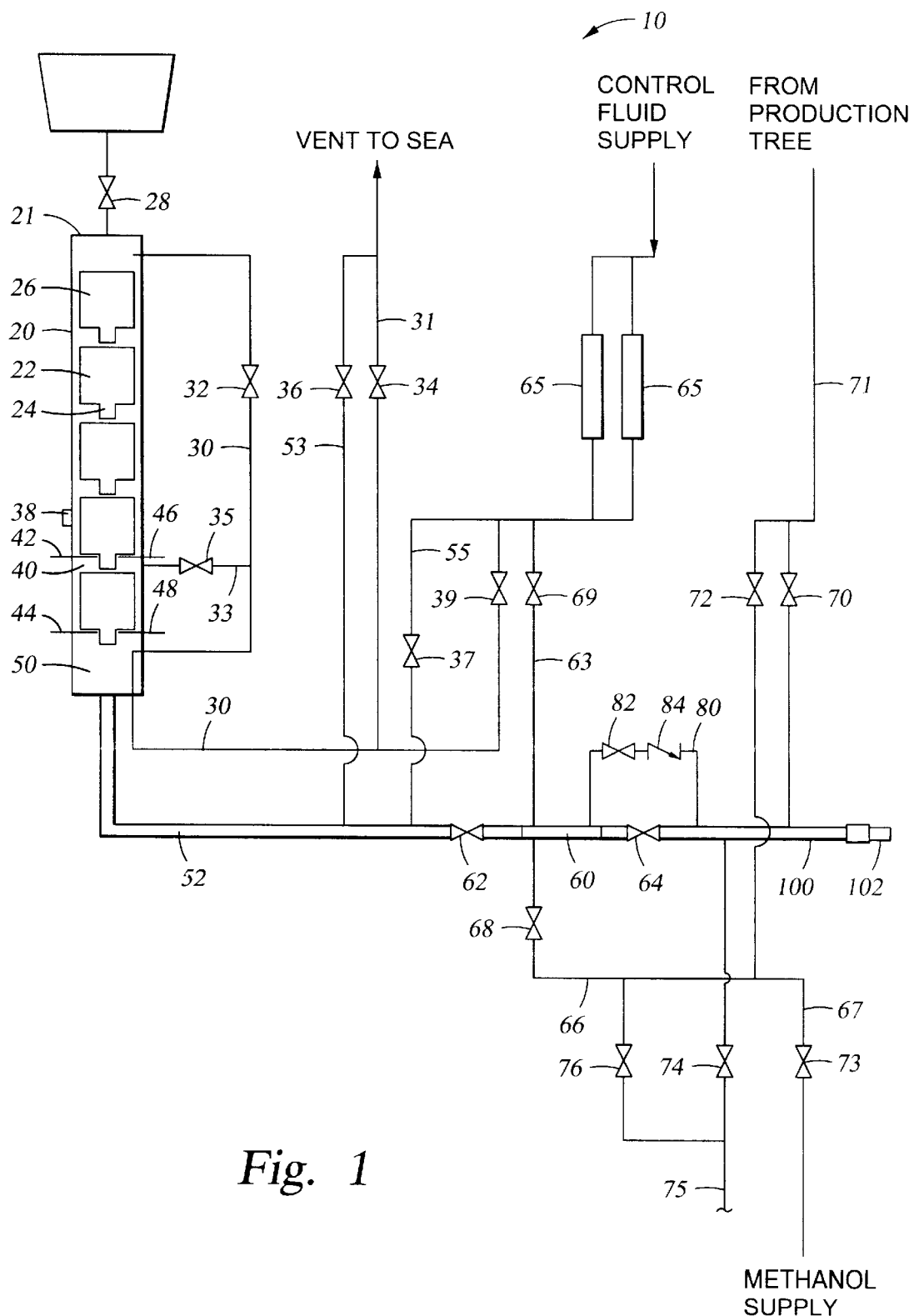
FIG. 1 is a schematic illustration of an apparatus constructed in accordance with a preferred embodiment of the present invention.

Referring initially to FIG. 1, a preferred embodiment of the present subsea pig launcher assembly 10 includes a pig storage barrel 20, which is preferably sized and configured to receive a ten to twelve pigs 22 stacked end to end. Although the discussion that follows and the attached Figures show barrel 20 installed on the manifold in vertical orientation, it will be understood that the system can be adapted for horizontal or inclined orientation of barrel 20. The inside diameter of barrel 20 is preferably slightly greater than the outside diameter of the pigs. This facilitates easy movement of pigs inside the barrel.

Figure 2:
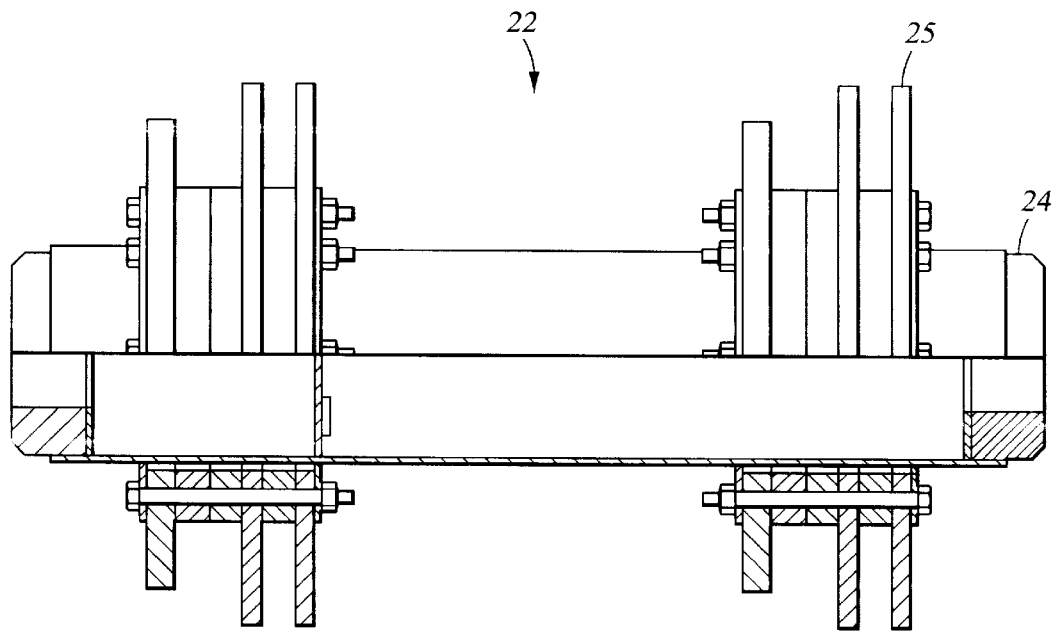
FIG. 2 is a side view, partially in cross-section, of a preferred pig configuration suitable for use in the apparatus of FIG. 1.
Figure 3:
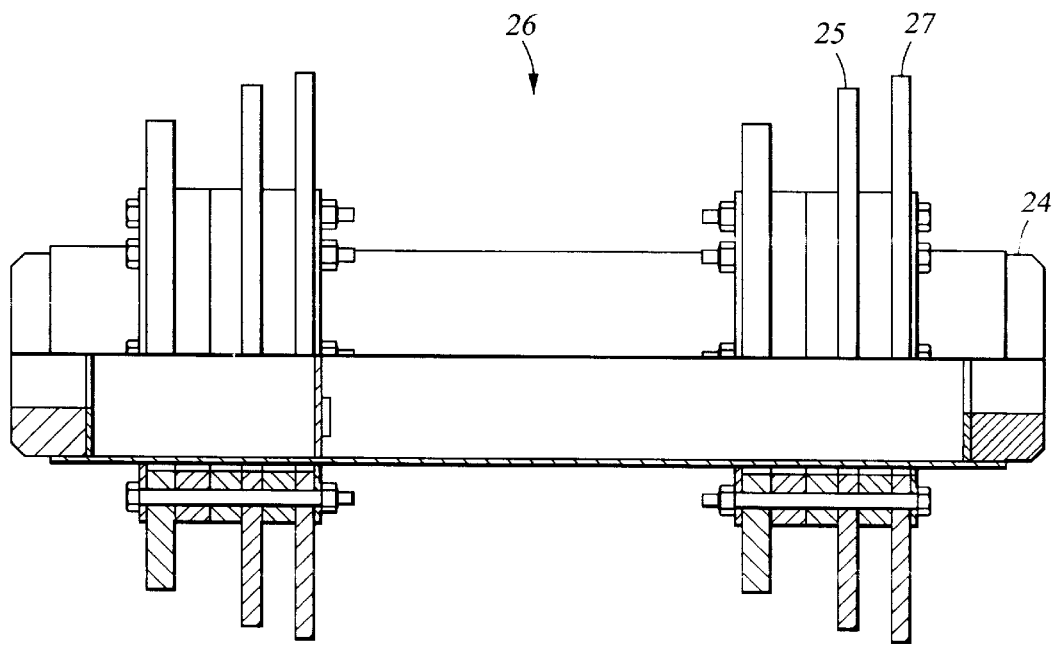
FIG. 3 is a side view, partially in cross-section, of a preferred piston pig configuration suitable for use in the apparatus of FIG. 1.

Referring briefly to FIGS. 2 and 3, in a preferred embodiment, pigs 22 each have an extending nose section 24, which facilitates stacking them directly and maintains a space between their radially extending fins 25. Each pig 22 may be fitted with any of various pipeline-cleaning or other special devices around its circumference, such as are known in the art.

Referring now to FIGS. 1 and 3, the last pig near the top of the barrel has a larger diameter fin 27 than the other pigs 22 and fits snugly and sealingly inside barrel 20 and is thus referred to as a piston pig 26. At the top of barrel 20 is a valve 28, which closes the inlet end 21 of barrel 20. Other types of closures can be used in place of valve 28. When valve 28 is open, pigs 22 can be loaded into barrel 20. A debris cap (not shown) above the valve is used to protect the valve inlet. It is preferred that valve 28 be operated "manually," although it is also contemplated that valve 28 could be remotely actuable.

If desired, a magnetic sensor 38 mounted on the barrel detects the passage of the piston pig, which includes a preinstalled magnet. Sensor 38 can be used to send a signal to inform the operator to reload a new stack of pigs into the barrel. It will be understood that other types of sensing devices can be used to sense the passage of the piston pig and that sensor 38 can alternatively be mounted at other suitable points along the launching apparatus 10.

Below pig storage barrel 20 is the pig parking chamber 40. Parking chamber 40 is defined by an upper pig stop 42 and a lower pig stop 44. Pig stops 42, 44 are preferably spaced one pig length apart. A spare set of pig stops 46, 48 is preferably provided as a backup. All pig stops are preferably provided with actuators for remote operation. The inside diameter of parking chamber is preferably selected to substantially fit the pig outside diameter. A parking chamber kicker valve 35 allows hydraulic fluid under pressure to flow behind the pig inside the parking chamber so as to push it out of the chamber when lower pig stop 44 is released.

A hydraulic line 30 enters barrel 20 near the top of barrel 20 allows hydraulic fluid or control fluid to be introduced under pressure behind the piston pig 26. Hydraulic line 30 is controlled by a remotely actuated valve 32. Providing hydraulic or control fluid under pressure behind piston pig 26 advances piston pig 26 and the other pigs down the barrel. A branch line 33 controlled by a valve 35 connects hydraulic line 30 to pig parking chamber 40. At its other end, hydraulic line 30 connects to vent line 31, which is controlled by valve 34, and to a fluid supply system that includes fluid accumulators 65. A valve 39 control fluid flow from accumulators to line 30. Thus, hydraulic line 30 can also be used as a vent line for discharging the seawater from barrel 20 during loading of pigs into the barrel. As mentioned above, the hydraulic or control fluid to be used for pushing pigs can be similar to the control fluids conventionally used for subsea systems, or can be any suitable fluid that has a density greater than seawater, is environmentally acceptable, and is chemically non-reactive with the polyurethane used in pigs.

At the bottom of the barrel is the hub of a dual bore mechanical connector 50 (collet type or alternate), which attaches the barrel to the system downstream on the manifold. Docking guides a soft landing system (not shown) and an alignment funnel (not shown) are preferably included to ensure proper orientation of the respective hubs during the connector makeup. Connector 50 is hydraulically operated to make-up and break the connection between storage barrel 20 and the manifold. The dual bore connector 50 provides a connection between barrel 20 and manifold pipe 52 connected to the flowline header for the pig transfer and also between the hydraulic line 30 on the manifold pipe 52 and on the launcher.

A vent line 53 is preferably provided on manifold pipe 52 and is controlled by valve 36. Hence, valves 34 and 36 allow venting of fluids from the launcher barrel from the bottom and the top, respectively, as explained in detail below. Similarly, a fluid supply line 55 provides hydraulic or control fluid under pressure from accumulators 65 to manifold pipe 52. As disclosed above, direct hydraulic supply from hoses connected to the host platform can provide adequate fluid supply in some cases. Flow through line 55 is controlled by valve 37.

Downstream of manifold pipe 52, is a pig launching chamber 60. Upstream and downstream isolation valves 62, 64, respectively, enclose the ends of the launching chamber 60. A flush line 63, which is controlled by valve 69, connects the upstream end of launching chamber 60 to the supply of control or hydraulic fluid 65. The downstream end of launching chamber 60 is preferably connected via valve 64 to the manifold production header 100, which in turn connects to the subsea flowline 102. A plurality of production lines 71, 75 feed produced hydrocarbons from wells into production header 100 downstream of valve 64. Fluid flow through lines 71, 75 into production header 100 is controlled by valves 70, 74, respectively. In a preferred embodiment, each production line also supports a branch line that feeds produced fluids into a kicker line 66, which communicates with the upstream end of launching chamber 60. These branch lines are controlled by branch valves 72, 76, respectively. Production fluids from the wells can be introduced into pig launching chamber 60 via kicker line 66. If desired, a methanol feed line 67 can also be connected to kicker 66, with fluid flow being controlled by a valve 73. A remotely activated valve 68 controls fluid flow through kicker line 66. A crossover connection 80 between launching chamber 60 and production header 100 via a remotely operated valve 82 and a check valve 84 allows fluids to flow from launcher barrel 60 into the production header 100 while bypassing valve 64.

Upstream of valve 62, hydraulic fluid under pressure from accumulators 65 or hydraulic line 30 can be introduced into pig storage barrel 20. Hydraulic line 31 and vent valve 34 permit draining of fluids from the bottom of the barrel.

In one preferred embodiment all valves except valve 28 are remotely operated and valve 28 is operated by remotely operated vehicle. In an alternative embodiment, all valves are ROV operable.

Operation

Installing the Launcher: The pig delivery barrel 20 is installed on manifold pipe 52 using multi-bore hydraulic connector 50. The connector is preferably configured such that the connection can be made using a remotely operated vehicle (ROV), such as that shown in FIG. 4, or other suitable ROV. The ROV preferably connects hydraulic control lines and electrical signal lines on pig storage barrel 20 to a control pod (not shown) on manifold pipe 52 using flying leads.

Pig storage barrel 20 is filled with seawater after installation on the manifold. All valves except branch valves 70, 74 etc., which connect the individual wells to header 100, are closed.

Figures 4, 5:
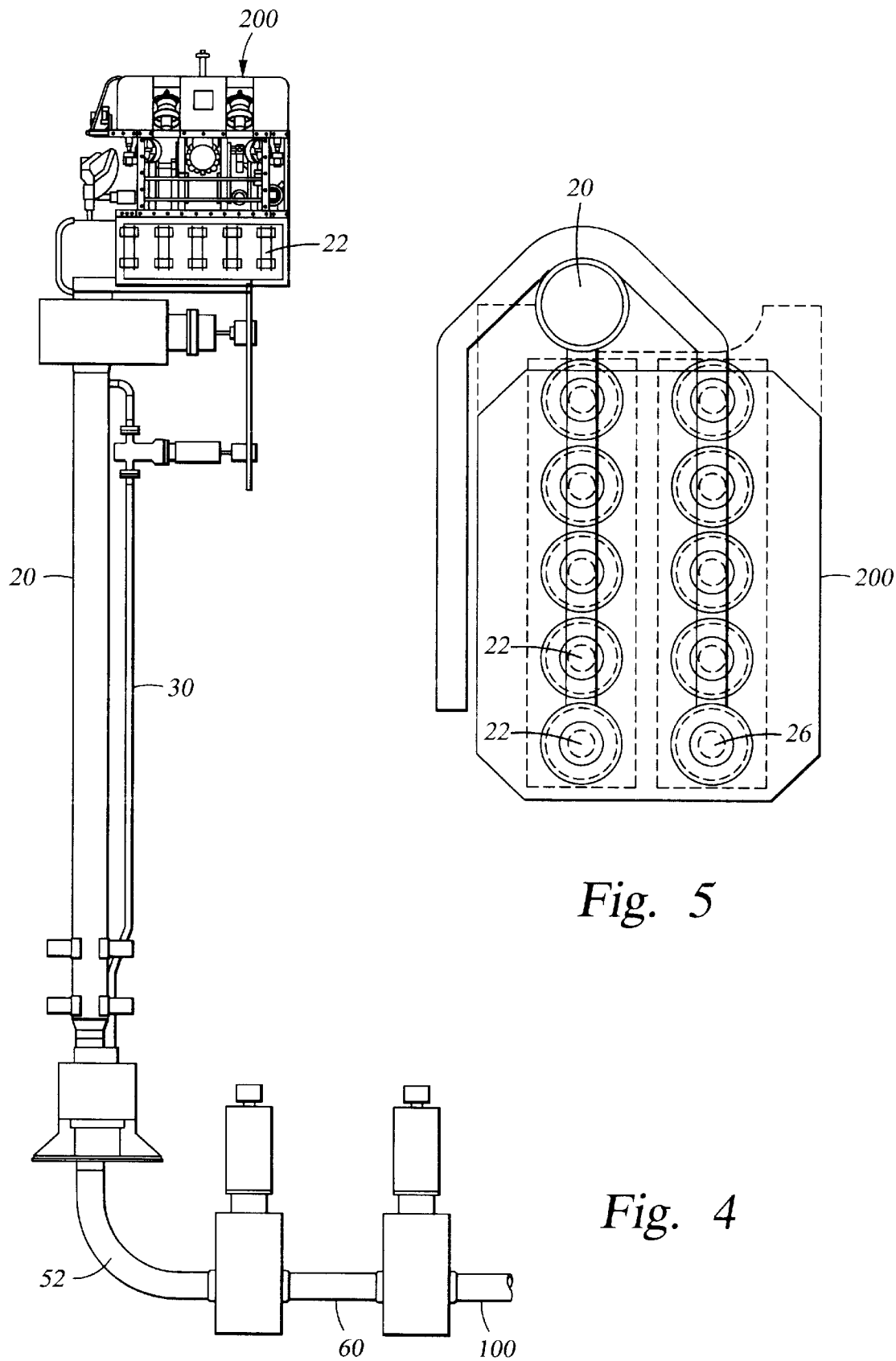
FIG. 4 is a schematic side elevation of a preferred embodiment of pig transfer equipment used in conjunction with the apparatus of FIG. 1.
FIG. 5 is a schematic plan view of the pig transfer equipment of FIG. 4.

Loading Pigs: Referring to FIGS. 4 and 5, an ROV 200 carrying a predetermined number of pigs 22 lands on or connects to a platform at the top of storage barrel 20. A preferred pig transportation and loading mechanism used by ROV 200 is described in provisional application Ser. No. 06/246,769, referenced above. The debris cap is opened by the ROV 200. The loading valve 28 at the top of the barrel is opened. Also, valve 32 and vent valves 34 and 36 are opened. ROV 200 preferably loads the pigs 22 into the barrel one at a time. The last pig to be loaded is piston pig 26, after which loading valve 28 is closed.

Flushing Pig Delivery Barrel: Valves 32 and 34 remain open. Valve 36 is closed. Hydraulic fluid under pressure is introduced at the bottom of the barrel by opening valve 37. The hydraulic fluid preferably has a higher density than seawater; hence it flushes the seawater from barrel 20 as it fills barrel 20 from the bottom. The seawater leaving barrel 20 exits through valves 32 and 34. Once barrel 20 is full of hydraulic fluid, which can be detected by observing color of fluid at the vent port by the ROV 200, then valves 37, 32, 34 and 36 will be closed.

Loading Pig into Parking Chamber: Upper pig stop 42 is opened, while lower pig stop remains closed. Fluid pressure across valve 62 is equalized by opening valves 37 and 69. Then valve 62 is opened, valves 37 and 69 are closed, and crossover valve 82 is opened. By opening valves 39 and 32, hydraulic fluid pressure can be applied behind piston pig 26. This advances one pig into the pig parking chamber 40, where it is stopped by lower pig stop 44. Once a pig is received in parking chamber 40, upper pig stop 42 and valves 39 and 32 are closed. Upper pig stop 42 prevents any additional pigs from entering chamber 40 until it is desired to launch another pig.

Loading Pig into Launching Chamber: Lower pig stop 44 and valves 39 and 35 are opened. This introduces hydraulic fluid under pressure behind the pig in parking chamber 40, causing it to advance into launching chamber 60. The fluid in front of the pig is dumped into production header 100 via crossover valve 82. After the pig is inside launching chamber 60, valves 39, 35, 62 and 82 are closed.

Launching Pig: Valves 76 and 68 are opened to equalize pressure inside launching chamber 60. Valve 64 is opened. The trees are choked down as necessary. Branch valves 70, 74 on some or all wells may be closed as necessary so as to divert production flow behind the pig and launch the pig into production header 100. After the pig is detected leaving production header 100, valve 64 is closed and the wells are brought back to full production.

Flushing Kicker Line and Pig Launching Chamber: All production kicker valves 72, 76 etc. between the wells and kicker line 66 are closed. Launching chamber isolation valve 64 is closed. Valve 68 remains open. Methanol injection valve 73 and bypass valve 82 are opened. This permits flushing of kicker line 66 and launching chamber 60 with methanol so as to displace any residual hydrocarbon fluid. After flushing with methanol, valves 82, 68, and 73 are closed. To flush launching chamber 60 with hydraulic fluid, valves 82 and 69 are opened and high pressure control fluid is allowed to flush launching chamber 60. The excess control fluid is pushed into production header 100 via valve crossover 82. After a sufficient time to ensure that chamber 60 is filled with control fluid, valves 82 and 69 are closed.

At this point, the pig launcher is ready to launch another pig into the flowline. Each launch cycle includes the steps of flushing the components of the apparatus with a hydraulic or control fluid. The time period between launchings will vary, depending on the rate at which the downstream flowline accumulates buildup, and may be as long as two to three years. The last pig i.e., piston pig 26 is launched in the same manner as the other pigs.

It is preferred that each valve in the present system be remotely actuable. The valves can be hardwired to a controller, or can be configured to respond to radio, acoustic, electric, hydraulic or other types of signal. In addition, a microprocessor (not shown) can be provided for operating the various valves in sequence.

Although the invention is intended for deepwater pigging operations, it can be also used for pigging of flowlines in shallow water with the benefit of eliminating any diver intervention during such operations and also reducing the frequency of offshore intervention. The method and apparatus of the present invention make it possible to launch as many pigs as may be needed from a remote pig launcher without disconnecting the pig storage barrel from the launching apparatus. Also, because it separates pig storage and parking from pig launching, the present invention makes it possible to store the pigs in a hydraulic or control fluid that will not degrade the material from which they are made, and yet does not require the large volume of hydraulic or control fluid that would be needed if the same fluid were used to launch the pigs.

While a preferred embodiment of the present invention has be described, it will be understood that various modifications thereto can be made without departing from the scope of the present invention. For example, the precise positioning of various lines and valves can be altered, the number of various components, including barrels, chambers, accumulators and lines, can be altered, and the orientation of various components can be modified without affecting the operation of the present system. Likewise, while various steps may be disclosed or claimed in a particular order herein, it is not intended that any particular order be required unless such order is inherent in the carrying-out of the claim or explicitly recited.

What is claimed is:

1. A method for launching pigs into a production fluid pipeline, comprising the steps of:
   (a) providing a storage barrel having an inlet end and an outlet end and containing a plurality of pigs;
   (b) controlling advancement of the pigs out of the storage barrel;
   (c) providing a launching chamber out of which the pigs are launched into the pipeline, wherein the launching chamber is hydraulically isolatable from both the storage barrel and the pipeline;
   (d) advancing a pig out of the barrel into the launching chamber;
   (e) flushing the storage barrel with a hydraulic fluid;
   (f) advancing the pig out of the launching chamber; and
   (g) flushing the launching chamber.

2. The method according to claim 1 wherein step (b) comprises using a pair of co-acting pig stops to allow advancement of only one pig at a time.

3. The method according to claim 1 wherein step (d) comprises using hydraulic fluid to apply fluid pressure behind the pigs in the storage barrel.

4. The method according to claim 3 wherein step (f) comprises using production fluid to apply fluid pressure behind the pig in the launching chamber.

5. The method according to claim 1 wherein step (f) comprises using hydraulic fluid to apply fluid pressure behind the pig in the launching chamber.

6. The method according to claim 1 wherein step (e) comprises flushing the storage barrel with hydraulic fluid.

7. The method according to claim 1, further including the step of supplying additional pigs to the storage barrel.

8. A system for storing pigs and launching them into a pipeline, comprising:
   a pig storage barrel having an inlet end and an outlet end and an inside diameter sized to accommodate the pigs, said storage barrel including a pig parking chamber defined between an upper pig stop and a lower pig stop;
   a pig launching chamber downstream of said storage barrel, said launching chamber sized and configured to receive a pig from said parking chamber and connected to the pipeline so as to be able to launch a pig into the pipeline, wherein said launching chamber is hydraulically isolatable from both said storage barrel and the pipeline;
   a hydraulic pig advancing system in fluid communication with the storage barrel and the launching chamber; and
   a fluid flush system in fluid communication with the storage barrel chamber and the launching chamber.

9. The pig launching system of claim 8 wherein said pig storage barrel is adapted to receive pigs via its inlet end.

10. The pig launching system of claim 8 wherein said pig parking chamber is defined by a pair of pig stops.

11. The pig launching system of claim 8 wherein said hydraulic pig advancing system is in fluid communication with said barrel inlet end, said parking chamber and said launching chamber.

12. The pig launching system of claim 8 wherein said hydraulic pig advancing system receives hydraulic fluid from a hydraulic fluid supply.

13. The pig launching system of claim 8 wherein said fluid flush system is in fluid communication with said parking chamber and said launching chamber.

14. The pig launching system of claim 13, further including a hydraulic fluid that is environmentally acceptable for discharge in to sea and heavier than seawater.

15. The pig launching system of claim 8 wherein said fluid flush system receives fluid from a hydraulic fluid supply and from the pipeline.

16. The pig launching system of claim 8 wherein said system releases substantially no hydrocarbons in to sea during its operation.

* * * * *